(12) United States Patent
Burcham et al.

(10) Patent No.: US 9,769,609 B1
(45) Date of Patent: Sep. 19, 2017

(54) ADAPTIVE FEEDBACK IN CELL TOWER TRILATERATION LOCATING OF MOBILE COMMUNICATION DEVICES

(71) Applicant: Sprint Communications Company L.P., Overland Park, KS (US)

(72) Inventors: Robert H. Burcham, Overland Park, KS (US); Geoffrey A. Holmes, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1 day.

(21) Appl. No.: 15/047,443

(22) Filed: Feb. 18, 2016

(51) Int. Cl.
  *H04W 4/02* (2009.01)
  *H04W 4/22* (2009.01)
  *G01S 5/04* (2006.01)

(52) U.S. Cl.
  CPC ............. *H04W 4/023* (2013.01); *G01S 5/04* (2013.01); *H04W 4/22* (2013.01)

(58) Field of Classification Search
  CPC ............ H04W 4/023; H04W 4/22; G01S 5/04
  See application file for complete search history.

(56) References Cited

U.S. PATENT DOCUMENTS

2005/0107953 A1\* 5/2005 Sugla ..................... G01C 21/00
  701/300

\* cited by examiner

*Primary Examiner* — Kashif Siddiqui

(57) ABSTRACT

A method of adapting determination of location of mobile communication devices. The method comprises receiving and storing the time and self-location of an emergency (e911) call message from a mobile communication device. The method then retrieves the time and self-location information and the trilateration data associated with the mobile communication device that originated the e911 call message. An estimated position is then calculated from the trilateration data by using a trilateration position estimating model. An error is determined between the self-location and the estimated position of the mobile communication device, whereby the self-location is deemed authoritative. The trilateration position estimating model is adapted based on the error determined and then used to determine the position of a second mobile communication device.

20 Claims, 9 Drawing Sheets

ADAPTIVE FEEDBACK IN CELL TOWER TRILATERATION LOCATING OF MOBILE COMMUNICATION DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Emergency phone services are provided over landline phones as well as over wireless phones. Wireless emergency service may be referred to as e911. Federal law dictates that certain procedures be followed when handling e911 calls. One of those requirements is that a self-location determined by the originating mobile communication device be transmitted with the e911 call to the e911 handling station. This self-location may be performed by a global positioning system (GPS) radio receiver embedded in the mobile communication device.

Trilateration is a mobile communication device locating technique that is based on analyzing radio signals emitted by the mobile device and received by proximate cell towers. The received signals can be used to estimate the position of the mobile communication device.

SUMMARY

In an embodiment, a method of maintaining a trilateration position estimation algorithm evergreen is disclosed. The method comprises adapting a trilateration position estimation algorithm by, (A) for each of a plurality of emergency call records: (1) accessing emergency (e911) call data comprising a time of an e911 call, a self-location position of a mobile communication device originating the e911 call, and a phone number of the mobile communication device, (2) calculating an estimated position of the mobile communication device originating the e911 call using trilateration data selected from a wireless communication service provider data store based on the time of the e911 call and based on the phone number of the mobile communication device in a trilateration position estimation algorithm, and (3) determining an error between the self-location position of the mobile communication device and the estimated position of the mobile communication device, and (B) adapting the trilateration position estimation algorithm based on the errors between the self-location positions and the estimated positions of the mobile communication devices. The method further comprises periodically repeating the above steps of adapting the trilateration position estimation algorithm, whereby the trilateration position estimation algorithm is maintained evergreen and adapted to changing communication conditions comprising three or more of changing environment conditions, changing traffic patterns, network element firmware upgrades, network element software upgrades, and changing device model populations. The method further comprises determining a position of a second mobile communication device based on using the adapted evergreen trilateration position estimation algorithm.

In another embodiment, a method of adapting a plurality of independent trilateration position estimation models is disclosed. The method comprises receiving a plurality of emergency (e911) call messages from a plurality of mobile communication devices, wherein each e911 call message comprises a time and a self-location of the mobile communication device determined by the mobile communication device that originates the e911 call and storing the time and the self-location information of the e911 call messages in a data store. The method further comprises, for each of a plurality of independent trilateration position estimation models, where each different model is associated with a different value of a selection criteria (A) retrieving a selection of the e911 call messages from the data store, where the selection is based on a value of the selection criteria associated with a selected one of the models, (B) for each selected e911 call message (1) retrieving trilateration data associated with the mobile communication device that transmitted the selected e911 call message, where the trilateration data retrieved is associated with the time in the selected e911 call message, (2) calculating an estimated position of the mobile communication device that transmitted the selected e911 call message at the time in the selected e911 call message based on trilateration using the retrieved trilateration data in the one of the models, (3) determining an error between the self-location in the selected e911 call message and the estimated position of the mobile communication device that transmitted the selected e911 call message, where the self-location in the selected e911 call message is deemed authoritative; and (C) adapting the selected one of the models based on the errors determined based on the e911 call messages selected based on the value of the selection criteria associated with the selected one of the models. The method further comprise determining a value of the selection criteria that applies to a second mobile communication device, retrieving trilateration data for the second mobile communication device, and determining an estimated position of the second mobile communication device based on trilateration using the trilateration data for the second mobile communication device in the adapted trilateration position estimation model associated with the value of the selection criteria that applies to the second mobile communication device.

In yet another embodiment, a method of adapting determination of location of mobile communication devices by cell tower trilateration is disclosed. The method comprises receiving an emergency (e911) call message from a mobile communication device, wherein the call message comprises a time and a self-location of the mobile communication device determined by the mobile communication device and storing the time and the self-location information of the e911 call message in a data store. The method further comprises retrieving the time and self-location information of the e911 call message from the data store; retrieving the trilateration data associated with the mobile communication device that transmitted the e911 call message and associated with the time of the e911 call message; calculating an estimated position of the mobile communication device at the time of the e911 call message based on the retrieved trilateration data using a trilateration position estimation model; determining an error between the self-location of the mobile communication device and the estimated position of the mobile communication device determined using the trilateration position estimating model and the retrieved trilateration data, where the self-location of the mobile communication device is deemed authoritative; adapting the trilateration position estimating model based on the error determined; and determining a position of a second mobile communication device based on using the adapted trilateration position estimating model.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
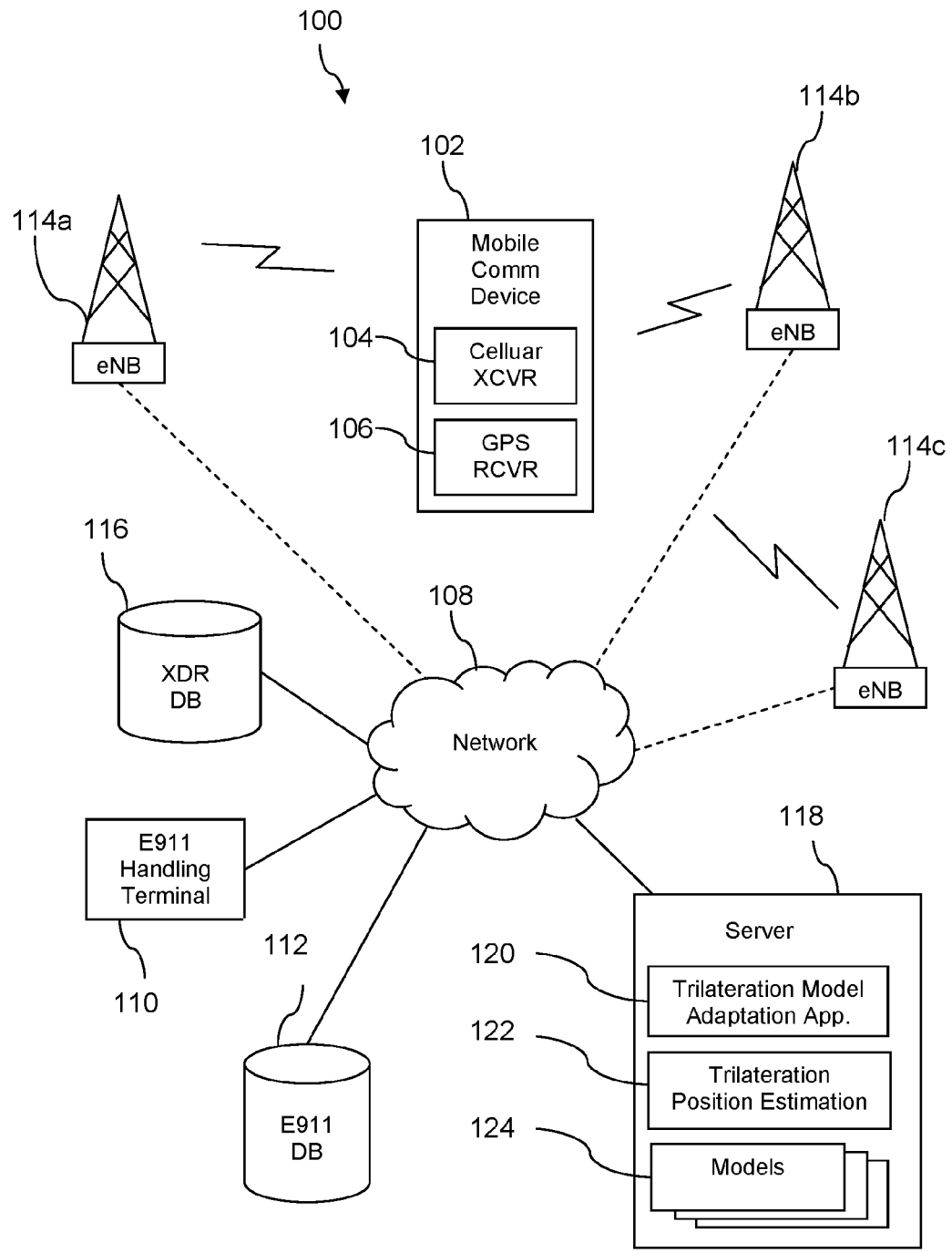
FIG. 1 is a block diagram of cellular communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a method of adapting determination of location of mobile communication devices by obtaining a time and a self-location of a mobile communication device through receiving an emergency (e911) call message and by obtaining the trilateration data associated with the mobile communication device at the time of the e911 call message. Further using the trilateration data in a trilateration position estimating model to estimate the mobile communication device's position, an error may be determined between the self-location and the estimated position, so the trilateration position estimating model may adapt to better estimate the position of mobile communication devices in the future. The trilateration position estimating algorithm may be maintained evergreen over time, which means that it is autonomously and continuously adapting to changes. For example, the changes may comprise changes in cell tower equipment, changes in new mobile phone models, and changes in the surroundings.

When emergency services are dialed by a mobile communication device, the device determines its own location (e.g., self-locates), using a GPS receiver embedded in the device, and transmits the GPS coordinates of the caller's device to the emergency services dispatcher. The dispatcher may be located in an e911 handling terminal. It is federally-mandated that e911 calls receive a device-sourced location data from a mobile communication device. A service provider cannot freely access a device's GPS location because the user would need to allow it and it would be inefficient and battery draining on the device. Also, e911 call data is a trustworthy source of information that is widely available across a geographical region and economically feasible to use. GPS self-location may be accurate to a radius of 9 meters.

The data collected from test probes by a service provider could be used to modify the trilateration position estimating model, but the test probe data does not accurately depict real-world circumstances. Test probe data is only collected sporadically, unlike the continuously collectable real-world data from e911 call messages. Test data may not account for the environment such as changing seasons which may affect the trilateration algorithm. Also, test probe data is not representative of the diverse mobile communication device models used by a population. A service provider may use a test-specific device to collect data, which does not take into account the variation of radio signal strength of different mobile communication devices.

While service providers prefer not to demand a device-sourced location from a mobile communication device, they can locate a device through trilateration of cell towers. In order to request and retrieve device-sourced location from a mobile communication device (e.g., initiated by the service provider and not pursuant to a user initiated e911 call), a service provider may first be obliged, by law or by consideration of subscriber privacy expectations, to request user approval to share their location. Users may view being asked for their location as an invasion of privacy. Even if users did consent to sharing their location, the service provider would need to archive the consent documents and support audits of those documents. Trilateration is a mobile communication device location estimation technique that is based on analyzing radio signals emitted by the mobile device and received by proximate cell towers. The received signals can be used to estimate the position of the mobile communication device. The trilateration position estimation algorithm may account for antenna file attributes associated with each cell tower involved in a trilateration calculation such as a latitude-longitude of the cell tower, an azimuth or down tilt of the cell tower antennas, a beam width of the cell tower antennas, a height of the cell tower, or other attributes related to the antenna file. The radio signals emitted by the mobile device may be affected by obstructions such as buildings and trees, providing an inaccurate location of the mobile device.

For example, after obtaining an e911 call time and self-location information (and possibly the phone number of the mobile device), the trilateration data of that mobile device at that time may be accessed through the service provider's data logs containing trilateration data on a very large number of mobile phones by selecting the trilateration data of the subject mobile phone based on a phone number, date, time, or any combination thereof, associated with the e911 call. A trilateration position estimating model may be used to estimate the position of the mobile communication device from the obtained trilateration data. A comparison can be made between the device-sourced position and the network-sourced position. The GPS-based device sourced position would be deemed the correct location in comparison to the estimated position. The difference between the estimated position and the correct location (e.g., the location provided by the GPS of the mobile device) can be considered an error of the trilateration estimate, and that error may then be used to adapt the trilateration position estimating model. For example, the adaption algorithm may adapt trilateration model or trilateration algorithm parameters so as to reduce this error across a plurality of like trilateration position estimations. The estimation of mobile device locations using the enhanced trilateration model may be used in a multitude of manners. For example, restaurants may advertise specials to patrons currently around their business. Also, social media network applications may suggest material related to a user's location. Law enforcement may legally call upon the service providers to provide position estimates of a mobile device estimated using a trilateration algorithm under specifically defined circumstances.

Earlier approaches to defining and improving trilateration position estimation faced difficult challenges. They may have been based on position data collected using probes which, as indicated above, suffers from inaccuracy and non-representativeness. They may have been limited to producing a single "one size fits all" estimation model as a result of limited probe data. And it should be mentioned that collecting probe data itself is an added cost. The approach described herein to adapting trilateration position estimation based position data harvested from e911 calls avoids the cost of using probes and provides more data.

The method disclosed may be tailored to a region-by-region basis. For example, a different trilateration model may be defined and/or tuned for each different region in a mobile communication service provider network. The method may be tailored for other partitioning criteria, for example defining and/or tuning a different trilateration model for each different member of a partitioning scheme. This partitioning may be done based on different mobile device models, based on different cell tower radio transceiver equipment vendors, or based on other partitioning or clustering criteria.

The method may adapt the trilateration model continuously in an evergreen fashion to determine a mobile device's position. Factors such as seasonal changes and high travelling months may affect the trilateration position estimating model. For example, when trees lose their leaves in the autumn, the radio signal path may vary from the summer due to the decrease in interferences. Therefore, the evergreen position estimating model would adapt to this adjustment and modify the position estimate for this mobile communication device and future position estimates for other mobile communication devices. The model would dynamically update and adapt to changes in the region.

For example, a network element firmware or software upgrade may affect the trilateration position estimation. The evergreen trilateration position estimating model described herein would dynamically adapt to improve the accuracy of the trilateration position estimation model or algorithm. For another example, a release of a new mobile communication device version may cause the trilateration data to become skewed because of a difference in radio signal characteristics from the previous model. As the newer model becomes assimilated into the region and replaces a significant number of the older generation device, the system taught herein would adapt the trilateration position estimating model based on the error found between the e911 self-location data and the position estimated using the trilateration data in the trilateration model, whereby both locations reference the same time.

Turning now to FIG. 1, a cellular communication system 100 is disclosed. In an embodiment, the cellular communication system 100 comprises a mobile communication device 102. The mobile communication device 102 comprises a cellular transceiver 104 and a Global Positioning System (GPS) receiver 106. The cellular transceiver 104 may be transmitting wireless messages even if the mobile communication device 102 is not in use such as when the device is not actively engaged in a call. For example, the transceiver 104 may send handshaking messages periodically to one or more cell tower 114. In some contexts, wireless messages transmitted by the device 102—whether handshaking messages or live voice call or data call messages—may be referred to as trilateration data. It is understood that such wireless messages, when received by a cell tower, can be analyzed to determine a received signal strength of the wireless message and a received timing of the wireless message, and this determined signal strength and/or timing may be used in trilateration models and/or trilateration algorithms to estimate position of the device 102. The cellular transceiver 104 may not transmit if the mobile communication device 102 is completely powered off or has its battery removed. The mobile communication device 102 may be one of a mobile phone, a smart phone, a personal digital assistant (PDA), a media player, a wearable computer, a headset computer, a laptop computer, a notebook computer, or a tablet computer.

In an embodiment, the cellular communication system 100 also comprises a network 108. The network 108 may comprise one or more public networks, one or more private networks, or a combination thereof. The system 100 further comprises an emergency (e911) handling terminal 110, an e911 data store 112, a plurality of enhanced Node Bs (eNBs) 114, an external data representation (XDR) data store 116, and a server 118. In some contexts, an enhanced Node B 114 may also be referred to as a base transceiver station (BTS) and/or a cell tower. The mobile communication device 102 may be communicatively coupled with the network 108 through one of the enhanced Node Bs 114. It is understood that in different embodiments, any number of enhanced Node Bs 114 may be communicatively coupled to the network 108. The eNBs 114 may be of varying distances from the mobile communication device 102. Different vendors or original equipment manufacturers (OEMs) may manufacture the different network equipment elements of the eNBs 114. For example, different OEMs may manufacture the radio transceivers of different eNBs 114.

The e911 handling terminal 110 receives and directs the e911 call message from the mobile communication device 102. The e911 call message comprises a time and a self-location of the mobile communication device 102. It is understood that the time may indicate a date and time. For example, the time may represented by an elapsed time count referenced to a specific reference time (e.g., seconds since Jan. 1, 1970) and a date and time can be determined from the elapsed time count. The self-location of the mobile communication device 102 may comprise Global Positioning System (GPS) coordinates from the GPS receiver 106. The e911 data store 112 stores the time and the self-location of the e911 call message received from the mobile communication device 102. The e911 call may be received wirelessly according to at least one of a long term evolution (LTE), a code division multiple access (CDMA), a global system for mobile communications (GSM), or worldwide interoperability for microwave access (WIMAX) wireless communication protocol. The external data representation (XDR) data store 116 stores trilateration data logs of the service provider and other data related to mobile device 102 and eNBs 114.

The trilateration data logs may be accessed by the service provider of the mobile communication device 102 for trilateration data related to the time of the e911 call message to use in the trilateration position estimating model. The server 118 comprises a trilateration model adaptation application 120 stored in a non-transitory memory. The server 118 further comprises a trilateration position estimation application 122 and a plurality of models 124. When executed by a processor, the application 120 accesses a plurality of e911 call records, each of which may comprise a time, a phone number, a GPS position, or any combination thereof associated with a mobile communication device 102 that originated the e911 calls. It is understood that the time may indicate both a date and time. The plurality of e911 call records may be gathered over a periodic time interval such as every week, every 2 weeks, every month, or some other time period.

Using the phone number and time data from each of the e911 call records, the application 120 looks up corresponding trilateration data of each mobile communication device 102 in the XDR data store 116. From the trilateration data of each mobile communication device 102 that originated an e911 call, the application 120 uses the trilateration position estimating model 124 to estimate the position 122 of each of the devices 102. For each of the e911 calls, the trilateration model adaptation application 120 determines an error between the GPS self-location and the position estimated by the trilateration position estimation application 122 using the trilateration data in the trilateration position estimating model 124 (an unadapted model or a model as defined in a previous cycle of model adaptation). The GPS position provided by the mobile device 102 during the e911 call is considered authoritative or correct. The trilateration model adaptation application 120 then minimizes the errors by adapting the trilateration position estimating model for all of the accessed e911 call records. This adaptation may be performed in an iterative fashion. That is, a first adaptation may be performed based on a first generation of determined errors, the process may be repeated to find a second generation of errors, a second adaptation may be performed to reduce the second generation of errors, a third generation of errors may be found, and a third adaptation may be performed to reduce the third generation of errors. The adaptation may be performed to minimize the error across a plurality of errors determined between the GPS location and the estimated position estimated by the trilateration position estimation application 122 based on the trilateration data and the adapted models 124. The application 120 may periodically repeat the aforementioned process using new e911 call data that has been accumulated since the previous iteration. The process may be repeated for a certain time interval such as every week, every 2 weeks, every month, or some other time interval.

The trilateration position estimating models may be altered to develop different, independently tuned or adapted models for subsets of e911 data. For example, a first model may be determined for calls in an east coast region, a second model may be determined for calls in a southern region, a third model may be determined for a Midwestern region, a fourth model may be determined for a Rocky Mountains region, and a fifth model may be determined for a west coast region. Depending on what region a device 102 is in, the model corresponding to that region may be used to estimate the position of the device 102 using the trilateration position estimation application 122 based on the trilateration data of the device 102 and the model corresponding to that region.

Said in other words, the application 120 may adapt the trilateration position estimating models 124 for a certain criteria or partitioning formula. The criteria may comprise a geographic criteria, a mobile device model criteria, a cell tower vendor criteria, or another selection criteria. The adapted trilateration position estimating models that the application 120 may produce are represented by the plurality of models 124. For example, the application 120 may also adapt the trilateration position estimating model on a region-by-region basis. The model may be adapted based on the error determined from e911 call records and a position estimate 122 using trilateration data from a town, a suburb, a city, a state or some other geographic region. The application 120 would retrieve e911 call data of a plurality of mobile communication devices 102 that occurred in a particular geographical region, which includes a phone number, a time, a GPS location, or any combination thereof of each device 102.

The enhanced or improved trilateration position estimation modeling may be used to estimate the position of mobile communication devices 102 for a variety of different purposes. This estimated position may be used to provide location based services to the devices 102, for example to provide a restaurant coupon to a selection of the devices 102 located within a predefined distance of a newly opened restaurant. The estimated position may be used to support law enforcement. The estimated position may be used by a service provider to analyze user behaviors on a statistical basis to improve the performance of the network.

Figure 2A:
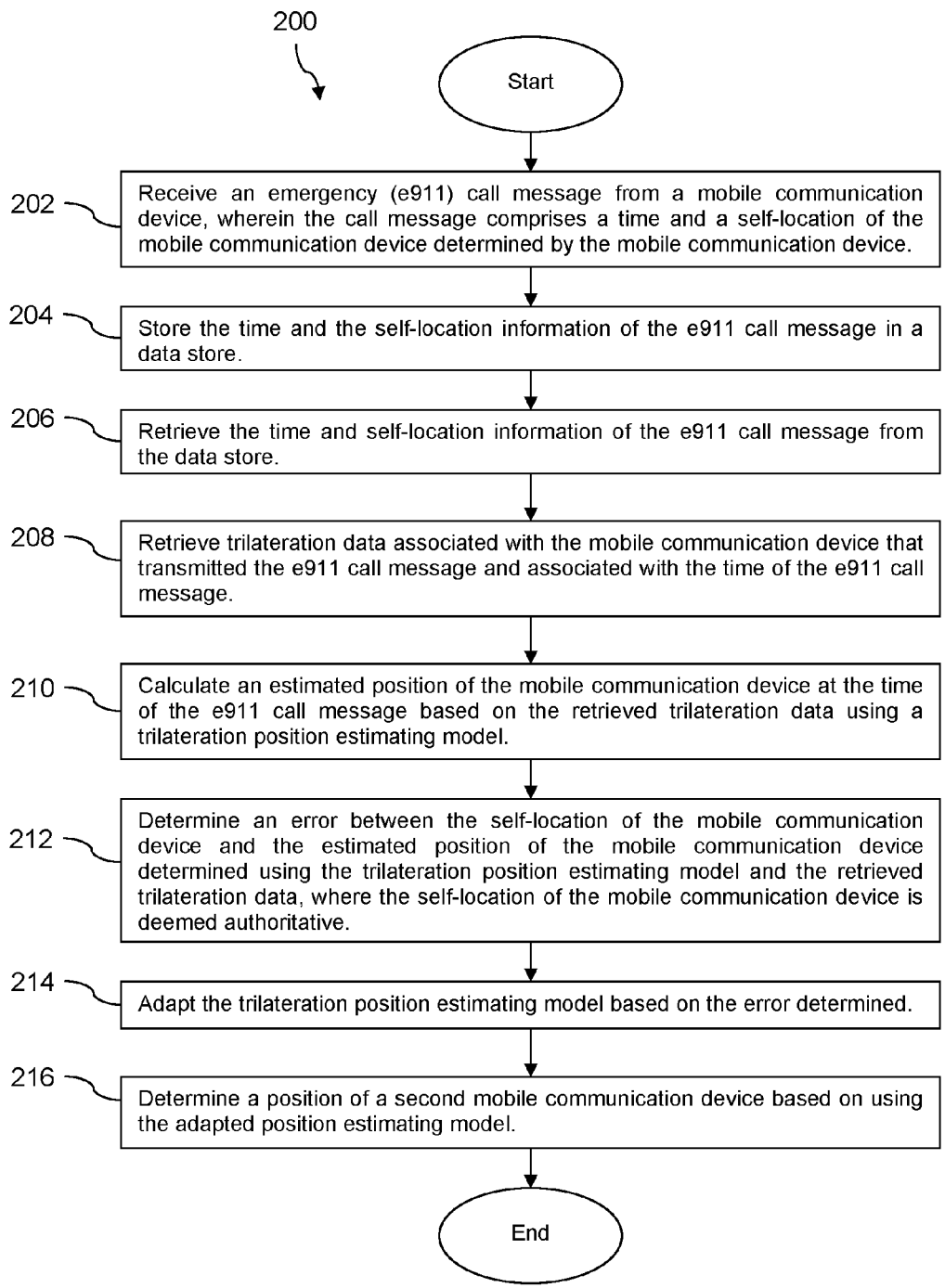
FIG. 2A is a flow chart of a method according to an embodiment of the disclosure.

Turning now to FIG. 2A, a method 200 is described. At block 202, an emergency (e911) call message from a mobile communication device 102 is received. The call message comprises a time and self-location of the mobile communication device determined by the mobile communication device. The time data may comprise a date and time. The self-location of the mobile communication device 102 may comprise GPS coordinates. At block 204, the time and the self-location information of the e911 call message is stored in an e911 data store 112. The e911 data store 112 may also store a phone number of a mobile communication device 102 associated with the e911 call message. At block 206, the time and the self-location information of an emergency call is retrieved from the e911 data store 112. The phone number of the device 102 that originated the subject emergency call may also be retrieved with the time and self-location information.

At block 208, the trilateration data associated with the mobile communication device 102 that transmitted the e911 call message and associated with the time of the e911 call message is retrieved. The trilateration data may be located or accessed by stipulating the time associated with the subject e911 call. The trilateration data may be located or accessed by stipulating both the time and the phone number that originated the subject e911 call. Retrieving the trilateration data associated with the mobile communication device may comprise retrieving external data representation (XDR) records generated by cell towers from a data store. At block 210, a trilateration position estimating model is used to calculate an estimated position of the mobile communication device at the time of the e911 call message based on the retrieved trilateration data.

At block 212, an error between the self-location of the mobile communication device 102 and the trilateration position estimate of the mobile communication device determined from the trilateration position estimating model with the retrieved trilateration data is determined. The self-location position of the mobile device is deemed authoritative. Based on the error determined, at block 214, the trilateration position estimating model is adapted with the goal of more precisely determining the position of the mobile communication device. The adaption of the trilateration position estimating model may minimize the error across a plurality of such comparisons. The plurality of such comparisons may be based on all e911 call data gathered over a periodic time interval. This time interval may be 1 week, 2 weeks, 1 month, or some other time interval. At block 216, a position of a second mobile communication device is determined based on using the adapted position estimating model. The second mobile communication device may be related to the first mobile communication device by employing the same RAN vendor, by being the same mobile communication device model, by being in the same geographical location, or by any other similarities shared by both devices. In an embodiment, location based services may be provided to the second mobile communication device based on the determined position of the device. The location based services may comprise nearby restaurant recommendations, coupons to nearby retailers, or other information based on devices in a specific geographical region. In some instances, the location information may be provided to law enforcement pursuant to a lawful inquiry.

Figure 2B:
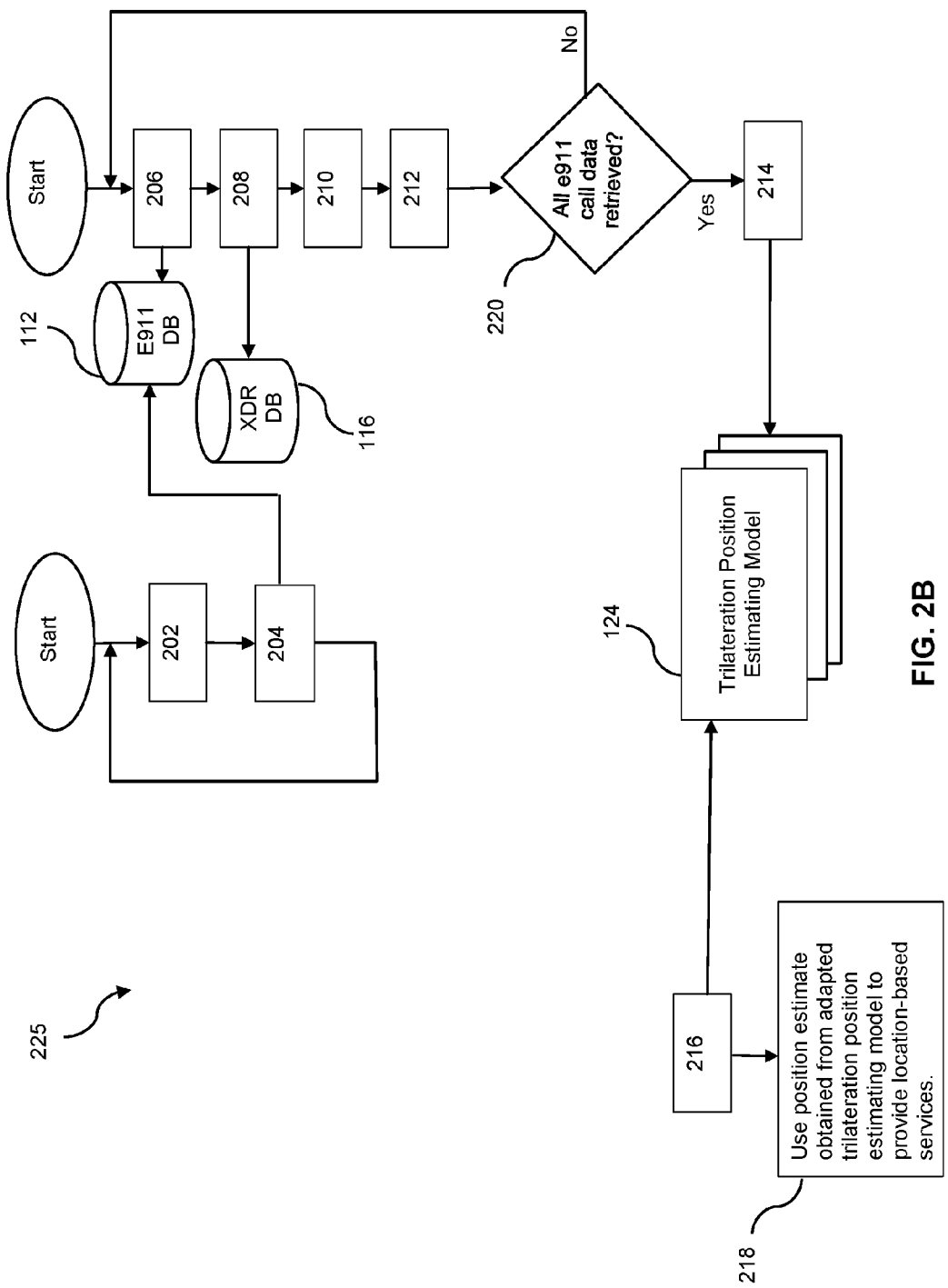
FIG. 2B is a flow chart of a method according to an embodiment of the disclosure.

Turning now to FIG. 2B, a method 225 is disclosed. The method 225 illustrates the entire process in which the e911 call messages are received by the e911 handling terminal 110 to providing location-based services to a second mobile communication device by using an estimated position of the second mobile communication device by an adapted trilateration position estimating model 124. The steps of method 225 are composed mostly of the steps of method 200 but illustrate that processing differently.

The processing of blocks 202 and 204 may be provided by an e911 call handling system. At block 202, an emergency (e911) call message is received from a mobile communication device 102 via a e911 handling terminal 110, wherein the call message comprises a time and a self-location of the mobile communication device 102 determined by the mobile communication device. It is understood that a time may comprise a date and time. The call message may also comprise a phone number of the mobile communication device 102. At block 204, the e911 call message data is stored in an e911 data store 112. Blocks 202 and 204 may repeat continuously as e911 calls are made and handled by the e911 handling system.

The processing of blocks 206, 208, 210, 212, 220, and 214 may be provided by the server 118 and/or the trilateration model adaptation application 120 described above. The interaction between the e911 system and the server 118 and/or the trilateration model adaptation application 120 is indirect, through the e911 data store 112. Said in other words, the e911 handling system may be entirely unaware of the server 118 and the trilateration model adaptation application 120, and the server 118 and the trilateration model adaptation application 120 may be entirely unaware of the e911 handling system, excepting that they work on or process at least some of the data in the e911 data store 112. The server 118 and/or trilateration model adaptation application 120 may repeat the processing of blocks 206, 208, 210, 212, 220, and 214 on some periodic basis, for example weekly, every two weeks, monthly, or some other periodic basis.

At block 206, the time and self-location information of the e911 call message are retrieved from the e911 data store 112. At block 208, trilateration data associated with the mobile communication device 102 that transmitted the e911 call message and associated with the time and phone number of the e911 call message is retrieved from an XDR data store 116. The phone number associated with the e911 call message may also be retrieved. The trilateration data stored in the XDR records may be generated by cell towers. At block 210, an estimated position of the mobile communication device 102 at the time of the e911 call is calculated based on the retrieved trilateration data from the XDR data store 116 using a trilateration position estimating model. At block 212, an error between the self-location of the mobile communication device 102 and the estimated position from using the trilateration position estimating model is determined. The self-location of the mobile communication device 102 is deemed authoritative.

At block 220, the method checks if all the e911 call data has been retrieved from the e911 data store 112 for the particular time interval, for example if all the call data that has been added to the e911 data store 112 since the previous cycle of executing blocks 206, 208, 210, 212, 220, and 214 have been processed. If the check yields a negative response, the above process from block 206 is repeated until block 220. If the check yields a positive response, the method proceeds to block 214. At block 214, the trilateration position estimating model is adapted to minimize the errors determined in block 212. It is understood that the processing of blocks 206, 208, 210, 212, 220, and 214 may be performed for each of a plurality of different category members or different valid values of a criteria (e.g., for each of a plurality of different regions, for each of a plurality of different OEM cell tower radio transceiver models), for example by executing blocks 206, 208, 210, 212, 220, 214 to adapt a first model; executing blocks 206, 208, 210, 212, 220, 214 to adapt a second model; and so on.

At block 216, the plurality of adapted trilateration position estimating models 124 may be used to determine the estimated position of a second mobile communication device. The processing of block 216 may be performed by the server 118 and/or the trilateration position estimation application 122 using the trilateration position estimating model or models 124 adapted by the processing of blocks 206, 208, 210, 212, 220, and 214. The second mobile communication device may be related to the first mobile communication device by sharing the same geographic region, the same mobile device model, the same cell tower vendor, or some other criteria. At block 218, the position estimate from using the adapted trilateration position estimating model may be used to provide location-based service to the second mobile communication device. The location-based services may comprise restaurant recommendations within a certain geographic radius from the estimate position of the second mobile communication device. For example, the position of a first mobile communication device may be estimated by the adapted trilateration position estimating model for this region to be located in a specific suburb. The position of a second mobile communication device may be estimated to be location in the same suburb as the first mobile communication device. The location-based service may then recommend a bar for the second mobile communication device. The location-based services may further comprise social media advertisements of local retailers. The estimated position of the second mobile device determined from the adapted trilateration position estimation algorithm may be provided to law enforcement pursuant to a lawful inquiry.

Figure 3:
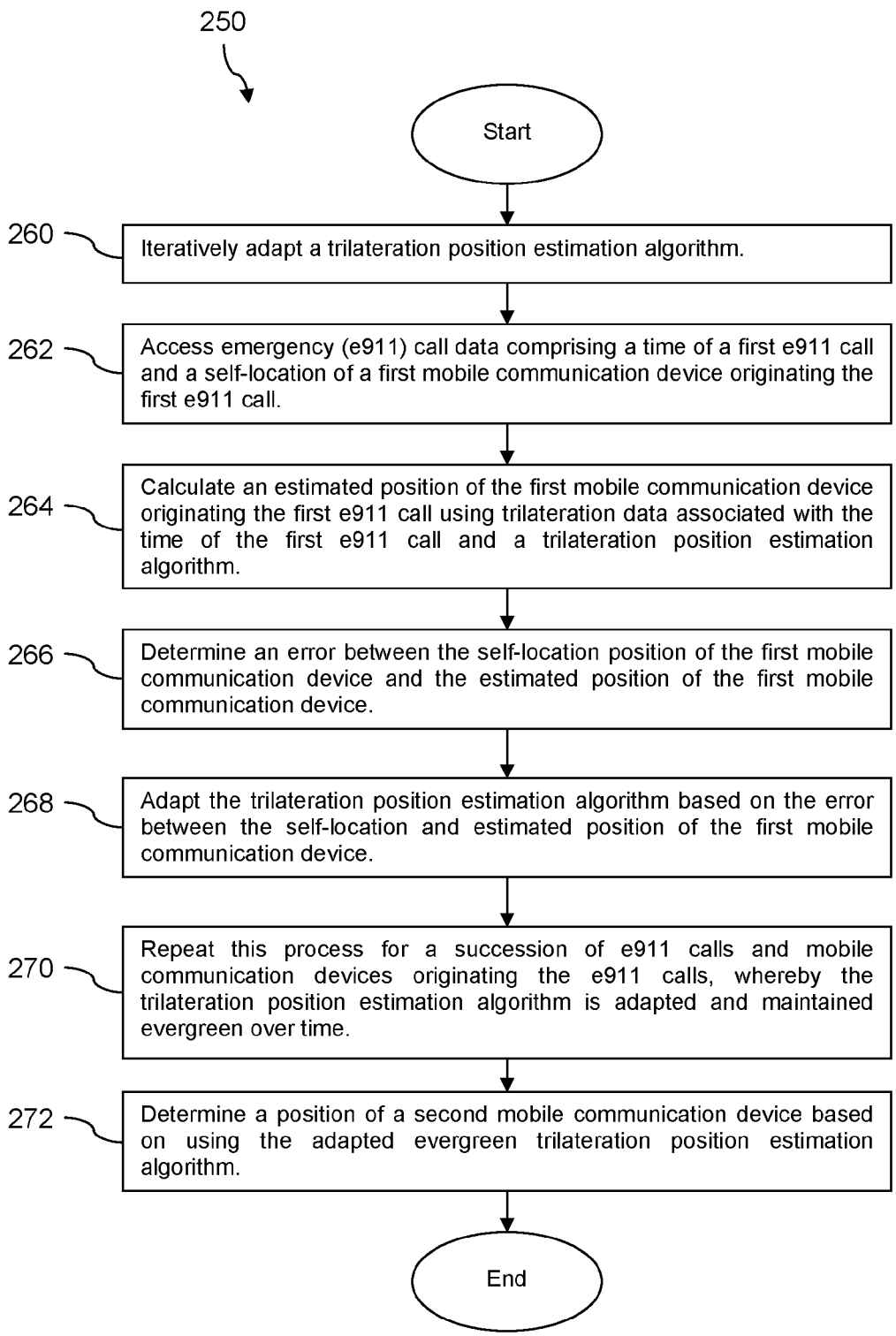
FIG. 3 is a flow chart of another method according to an embodiment of the disclosure.

Turning now to FIG. 3, a method 250 is described. At block 260, a trilateration position estimation algorithm is adapted iteratively by first accessing emergency (e911) call data comprising a time of a first e911 call and a self-location of a first mobile communication device originating the first e911 call, described in block 262. The self-location of a mobile communication device originating an e911 call may be accurate to a radius of 9 meters. At block 264, using trilateration data associated with the time of the first e911 call and a trilateration position estimation algorithm, an estimated position of the first mobile communication device originating the first e911 is calculated. The trilateration position estimation algorithm may account for antenna file attributes associated with each cell tower involved in a trilateration calculation such as a latitude-longitude of the cell tower, an azimuth or down tilt of the cell tower antennas, a beam width of the cell tower antennas, a height of the cell tower, or any of an attribute related to the antenna file. There exists a total of 43 attributes that defines an antenna file.

At block 266, an error between the self-location of the first mobile communication device and the estimated trilateration position of the first mobile communication device is determined, where the self-location position is deemed authoritative. At block 268, the trilateration position estimation algorithm is adapted based on the error between the self-location and estimated position of the first mobile communication device. This process is repeated in block 270 for a succession of e911 calls and mobile communication devices originating the e911 calls, whereby the trilateration position estimation algorithm is adapted and maintained evergreen overtime. The term evergreen denotes that the trilateration position estimation algorithm is continuously adapting to the error between the self-location and estimated trilateration position of a mobile communication device. The continuous adaptation may occur in a specified time interval such as every four hours, every day, every week, every month, or any other specified time interval.

At block 272, a position of a second mobile communication device is determined based on using the adapted evergreen trilateration position estimation algorithm. In an embodiment, location based services may be provided to the second mobile communication device based on the determined position of the device. The location based services may comprise nearby restaurant recommendations, coupons to nearby retailers, or other information based on devices in a specific geographical region. In some embodiments, the position of the second mobile device determined from the adapted evergreen trilateration position estimation algorithm may be provided to law enforcement pursuant to a lawful inquiry. For example, a police officer may locate a criminal using the adapted evergreen trilateration position estimation algorithm if a warrant has been issued for his/her arrest.

In an embodiment, a method of maintaining a trilateration position estimation algorithm evergreen is disclosed. The method comprises iteratively adapting a trilateration position estimation algorithm by accessing emergency (e911) call data comprising a time of a first e911 call and a self-location position of a first mobile communication device originating the first e911 call; calculating an estimated position of the first mobile communication device originating the first e911 call; calculating an estimated position of the first mobile communication device originating the first e911 call using trilateration data associated with the time of the first e911 call and a trilateration position estimation algorithm; determining an error between the self-location position of the first mobile communication device and the estimated position of the first mobile communication device; and repeating this process for a succession of e911 calls and mobile communication devices originating the e911 calls, whereby the trilateration position estimation algorithm is adapted and maintained evergreen over time. The method further comprises determining a position of a second mobile communication device based on using the adapted evergreen trilateration position estimation algorithm.

Figure 4:
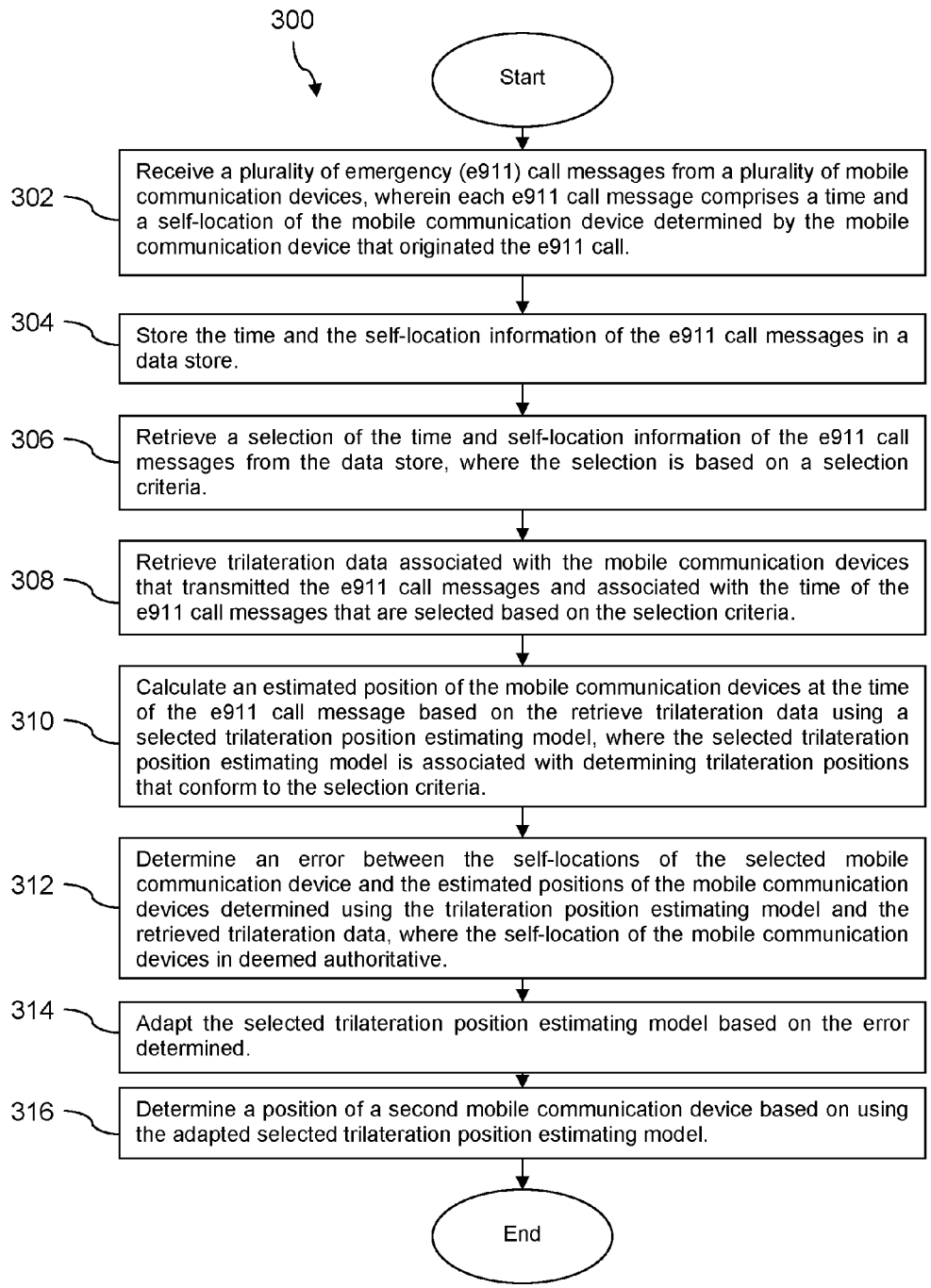
FIG. 4 is a flow chart of yet another method according to an embodiment of the disclosure

Turning now to FIG. 4, a method 300 is described. At block 302, a plurality of e911 call messages from a plurality of mobile communication devices are received, wherein each e911 call message comprises a time and a self-location of the mobile communication device that originated the e911 call. The self-location may be the GPS coordinates of the mobile communication device that originated the e911 call. The mobile communication devices may be one of a mobile phone, a smart phone, a personal digital assistant (PDA), a media player, a wearable computer, a headset computer, a laptop computer, a notebook computer, or a tablet computer. At block 304, the time and the self-location information of the e911 call messages are stored in an e911 data store 112. At block 306, a selection of the time and self-location information of the e911 call messages are retrieved from the data store 112, where the selection is based on a selection criteria. The selection criteria may identify a regional delimitation, a model of mobile communication device, a radio access network (RAN) vendor, a cell tower radio transceiver model, or any other selection criteria.

At block 308, trilateration data associated with the mobile communication devices that transmitted the e911 call messages and associated with the time of the e911 call messages that are selected based on the selection criteria are retrieved. At block 310, an estimated position of the mobile communication device at the time of the e911 call message is calculated using a selected trilateration position estimating model. The selected trilateration position estimating model is associated with determining trilateration positions that conform to the selection criteria. At block 312, an error between the self-locations of the selected mobile communication devices and the estimated positions of the mobile communication devices is determined. The estimated positions are determined using the trilateration position estimating model and the retrieved trilateration data. The self-location of the mobile communication device is deemed authoritative.

At block 314, the selected trilateration position estimating model is adapted based on the error determined. At block 316, a position of a second mobile communication device is determined based on using the adapted selected trilateration position estimating model. Using a selection criterion to adapt the trilateration position estimating model may further refine the algorithm to more accurately estimate a position of a mobile communication device. In an embodiment, location based services may be provided to the second mobile communication device based on the determined position of the device. The location based services may comprise nearby restaurant recommendations, coupons to nearby retailers, or other information based on devices in a specific geographical region. In some instances, the location information may be provided to law enforcement pursuant to a lawful inquiry.

In an embodiment, a method of adapting determination of location of mobile communication devices by cell tower trilateration is disclosed. The method comprises receiving a plurality of emergency (e911) call messages from a plurality of mobile communication devices, wherein each e911 call message comprises a time and a self-location of the mobile communication device determined by the mobile communication device that originates the e911 call and storing the time and the self-location information of the e911 call messages in a data store. The method further comprises retrieving a selection of the time and self-location information of the e911 call messages from the data store, where the selection is based on a selection criteria; retrieving trilateration data associated with the mobile communication devices that transmitted the e911 call messages and associated with the time of the e911 messages that are selected based on the selection criteria; calculating an estimated position of the mobile communication devices at the time of the e911 call message based on the retrieved trilateration data using a selected trilateration position estimating model, where the selected trilateration position estimating model is associated with determining trilateration positions that conform to the selection criteria; determining an error between the self-locations of the selected mobile communication device and the estimated positions of the mobile communication devices determined using the trilateration position estimating model and the retrieved trilateration data, where the self-location of the mobile communication devices is deemed authoritative; adapting the selected trilateration position estimating model based on the error determined; and determining a position of a second mobile communication device based on using the adapted selected trilateration position estimating model.

Figure 5:
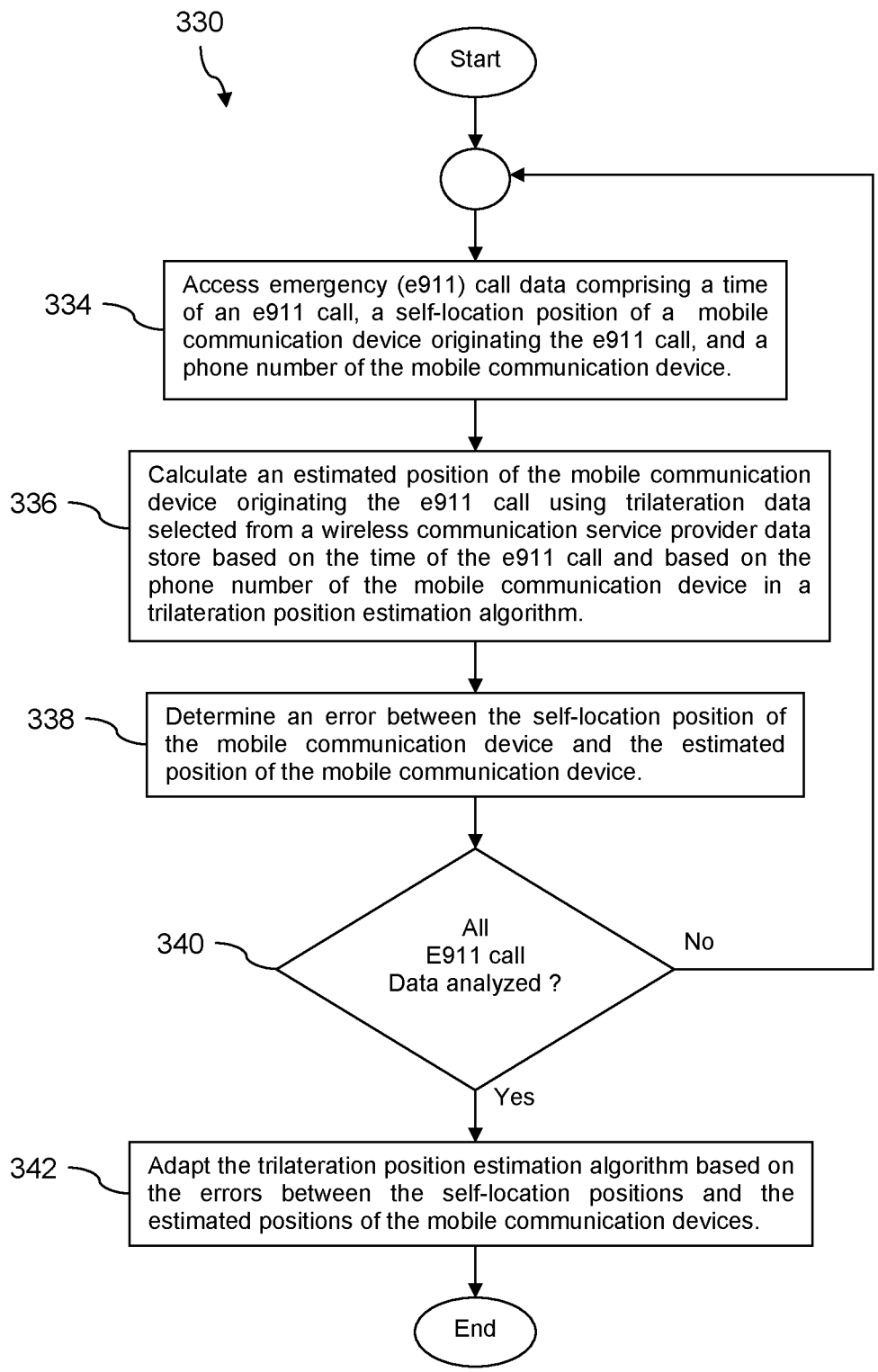
FIG. 5 is a flow chart of another method according to an embodiment of the disclosure.

Turning now to FIG. 5, a method 330 is described. The method 330 may be used to maintain a trilateration position estimation algorithm "evergreen." At block 334, access an emergency (e911) call data comprising a time of an e911 call, a self-location position of a mobile communication device originating the e911 call, and a phone number of the mobile communication device. The e911 call data may be accessed from the e911 data store 112 described above with reference to FIG. 1. At block 336, calculate an estimated position of the mobile communication device originating the e911 call using trilateration data selected from a wireless communication service provider data store based on the time of the e911 call and based on the phone number of the mobile communication device in a trilateration position estimation algorithm. At block 338, determine an error between the self-location position of the mobile communication device and the estimated position of the mobile communication device. The processing of blocks 334, 336, and 338 may be repeated for each of a plurality of e911 call data entries in the e911 data store 112. The processing of blocks 334, 336, 338 may be limited to processing e911 call data entries that are new since the last iteration of blocks 334, 336, 338. If unanalyzed e911 call data remains, at block 340, processing returns to block 334 in which a different e911 call data entry is accessed. If no unanalyzed e911 call data remains, at block 340, processing proceeds to block 342.

At block 342, adapt the trilateration position estimation algorithm based on the errors between the self-location positions and the estimated positions of the mobile communication devices. The adaptation in block 342 may be directed to minimizing the sum of the absolute value of the errors. In an embodiment, the e911 call data accessed in block 334 may be stored temporarily, and the processing of blocks 336, 338, 342 may be repeated using different adaptations of the trilateration position estimation algorithm or model to successively improve the accuracy of the algorithm and reduce the error. Adapting the trilateration position estimation algorithm may entail adapting trilateration models and/or model parameters or coefficients.

The processing of blocks 334, 336, 338, 340, and 342 may periodically be repeated, whereby the trilateration position estimation algorithm is maintained evergreen and adapted to changing communication conditions. In an embodiment, changing communication conditions may comprise at least one of changing environment conditions, changing traffic patterns, network element firmware upgrades, network element software upgrades, and changing device model populations. In another embodiment, changing communication conditions may comprise at least two of changing environment conditions, changing traffic patterns, network element firmware upgrades, network element software upgrades, and changing device model populations. In yet another embodiment, changing communication conditions may comprise three or more of changing environment conditions, changing traffic patterns, network element firmware upgrades, network element software upgrades, and changing device model populations. Said in other words, when the communication conditions change, the accuracy of the trilateration position estimation algorithm may be reduced. This reduced accuracy would lead to increased errors found in block 338. The trilateration position estimation algorithm would then be adapted to reduce this error, increasing the algorithm accuracy, and keeping the trilateration position estimation algorithm well adapted or "evergreen." It is understood that the changing communication conditions may change one at a time and in different locations or portions of a mobile communication network. In an embodiment, the processing of blocks 334, 336, 338, 340, and 342 may be performed by a server computer, for example server 118 described above with reference to FIG. 1.

The adapted evergreen trilateration position estimation algorithm may be used to determine a position of a second mobile communication device. For example, trilateration parameters associated with the second mobile communication device may be collected, the trilateration parameters may be input into the evergreen trilateration position estimation algorithm, and the algorithm may output an estimated position of the second mobile communication device. The estimated position of the second mobile communication device may be used to provide location based services for the second mobile communication device or other services described above.

Figure 6A:
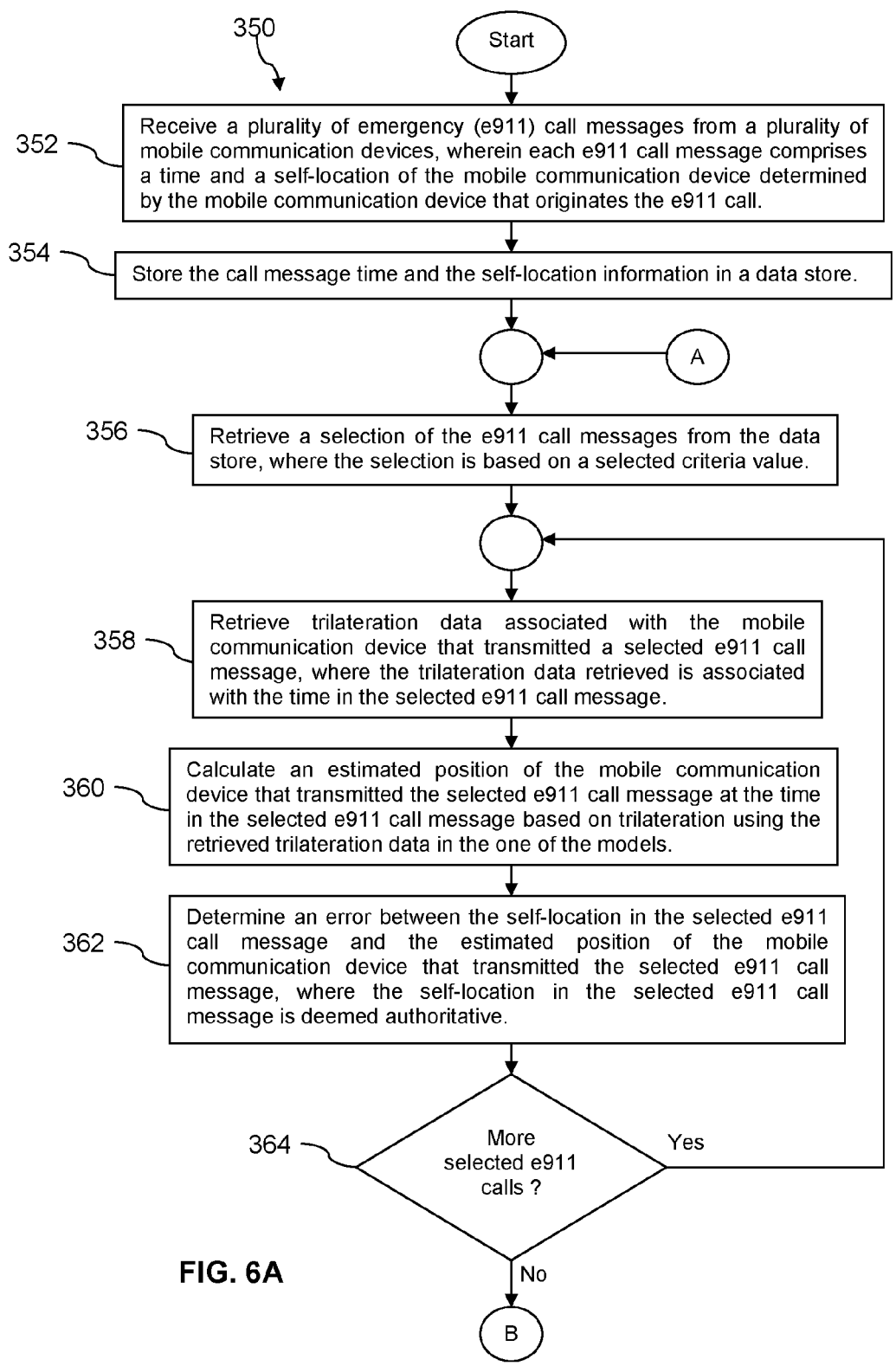
FIG. 6A and FIG. 6B is a flow chart of still another method according to an embodiment of the disclosure.
Figure 6B:
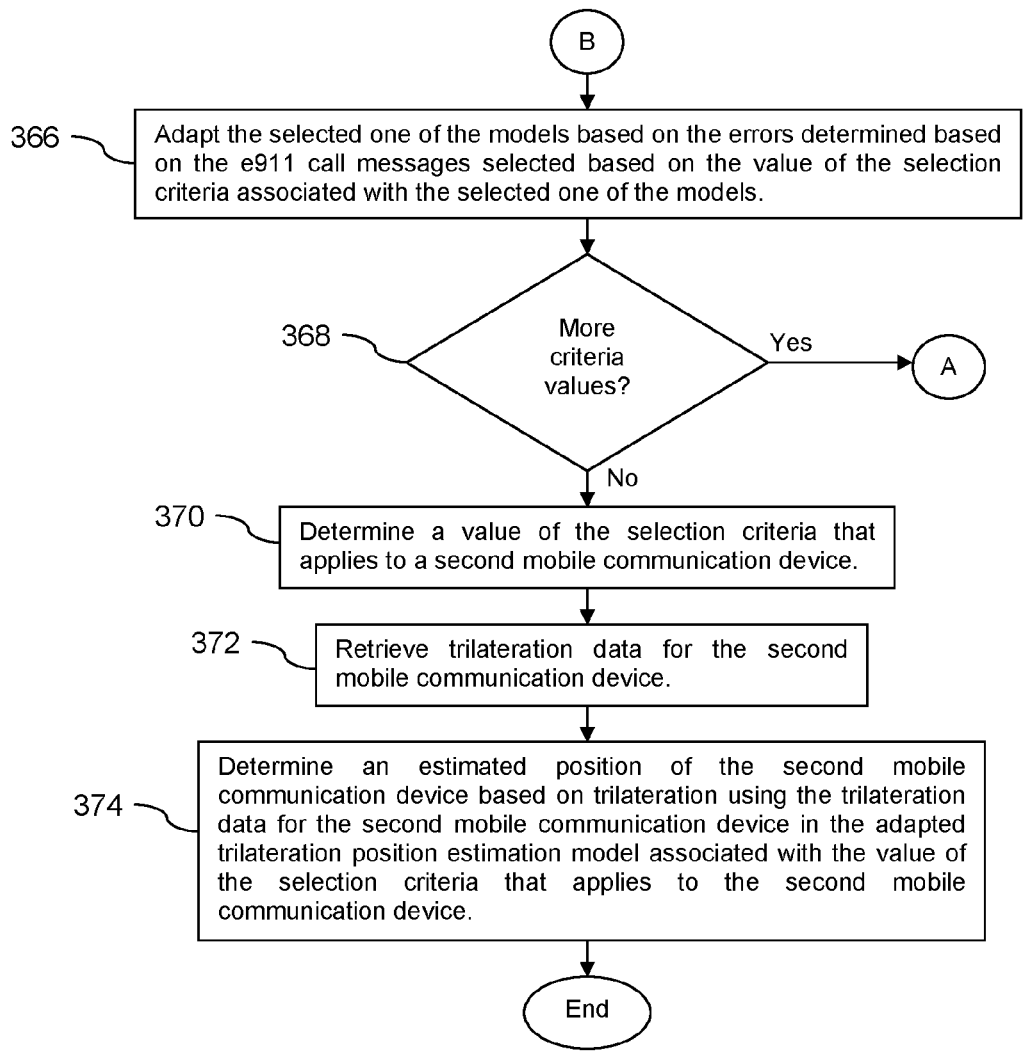

Turning now to FIG. 6A and FIG. 6B, a method 350 is described. The method 350 may be performed, at least in part (e.g., blocks 356-368) by a server computer, for example server 118 described above with reference to FIG. 1, to adapt a plurality of independent trilateration position estimation models. At block 352, receive a plurality of emergency (e911) call messages from a plurality of mobile communication devices, wherein each e911 call message comprises a time and a self-location of the mobile communication device determined by the mobile communication device that originates the e911 call. At block 354, store the time and the self-location information of the e911 call messages in a data store, for example in e911 data store 112 described above with reference to FIG. 1. Perform the processing of blocks 358-366 for each of a plurality of different values of a criteria. For example, perform the processing of blocks 358-366 for each of a plurality of independent trilateration position estimation models, where each different model is associated with a different value of a selection criteria.

At block 356, retrieve a selection of the e911 call messages from the data store, where the selection is based on a value of the selection criteria associated with a selected one of the models. For each e911 call message selected in block 356, performing the processing of blocks 358-364. At block 358, retrieve trilateration data associated with the mobile communication device that transmitted the selected e911 call message, where the trilateration data retrieved is associated with the time in the selected e911 call message. At block 360, calculate an estimated position of the mobile communication device that transmitted the selected e911 call message at the time in the selected e911 call message based on trilateration using the retrieved trilateration data in the one of the models. At block 362, determine an error between the self-location in the selected e911 call message and the estimated position of the mobile communication device that transmitted the selected e911 call message, where the self-location in the selected e911 call message is deemed authoritative. At block 364, if all the e911 call messages selected based on the currently selected criteria value have been processed, processing proceeds to block 366. At block 366, adapt the selected one of the models based on the errors determined based on the e911 call messages selected based on the value of the selection criteria associated with the selected one of the models.

At block 368, if all criteria values have not been processed according in blocks 356-366, a different criteria value is selected and processing returns to block 356. If all criteria values have been processed, then all the trilateration position estimation models for each different criteria value have been updated. In some cases the method 350 may stop here. The use of the adapted trilateration position estimation models is illustrated by blocks 370, 372, and 374. In an embodiment, the method 350 further comprises processing of blocks 370, 372, and 374. At block 370, determine a value of the selection criteria that applies to a second mobile communication device. At block 372, retrieve trilateration data for the second mobile communication device. At block 374, determine an estimated position of the second mobile communication device based on trilateration using the trilateration data for the second mobile communication device in the adapted trilateration position estimation model associated with the value of the selection criteria that applies to the second mobile communication device. The estimate of the position of the second mobile communication device may be used to provide various location based or location related services as described above.

Figure 7:
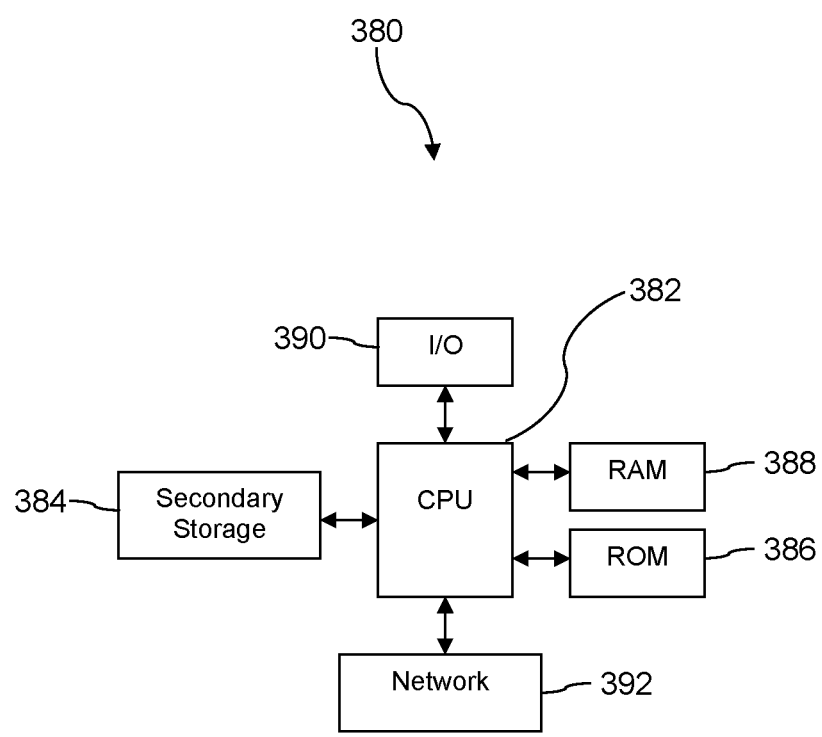
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of maintaining a trilateration position estimation algorithm evergreen, comprising:
adapting a trilateration position estimation algorithm by, for each of a plurality of emergency call records,
accessing emergency (e911) call data comprising a time of an e911 call, a self-location position of a mobile communication device originating the e911 call, and a phone number of the mobile communication device,
calculating an estimated position of the mobile communication device originating the e911 call using trilateration data selected from a wireless communication service provider data store based on the time of the e911 call and based on the phone number of the mobile communication device in a trilateration position estimation algorithm,
determining an error between the self-location position of the mobile communication device and the estimated position of the mobile communication device, and
adapting the trilateration position estimation algorithm based on the errors between the self-location positions and the estimated positions of the mobile communication devices, and
periodically repeating the above steps of adapting the trilateration position estimation algorithm, whereby the trilateration position estimation algorithm is maintained evergreen and adapted to changing communication conditions comprising three or more of changing environment conditions, changing traffic patterns, network element firmware upgrades, network element software upgrades, and changing device model populations; and
determining a position of a second mobile communication device based on using the adapted evergreen trilateration position estimation algorithm.

2. The method of claim 1, wherein when a radio access network (RAN) comprising a plurality of cell towers that generate the trilateration data changes, the trilateration position estimation algorithm automatically is adapted over time to reflect the changed RAN.

3. The method of claim 1, wherein the trilateration position algorithm takes into consideration antenna file attributes associated with each cell tower involved in a trilateration calculation.

4. The method of claim 3, wherein the trilateration position algorithm takes into consideration antenna file attributes comprising an azimuth of cell tower antennas, a latitude-longitude of the cell tower, a beam width of cell tower antennas, and a height of the cell tower.

5. The method of claim 1, wherein the self-location position of the mobile communication device originating a 911 call is accurate to within a 9 meter radius.

6. The method of claim 1, further comprising providing location based services to the second mobile communication device based on the determination of the position of the second mobile communication device.

7. The method of claim 1, further comprising providing the position of the second mobile communication device determined based on using the adapted evergreen trilateration position estimation algorithm to law enforcement pursuant to a lawful inquiry.

8. A method of adapting a plurality of independent trilateration position estimation models, comprising:
receiving a plurality of emergency (e911) call messages from a plurality of mobile communication devices, wherein each e911 call message comprises a time and a self-location of the mobile communication device determined by the mobile communication device that originates the e911 call;
storing the time and the self-location information of the e911 call messages in a data store;
for each of a plurality of independent trilateration position estimation models, where each different model is associated with a different value of a selection criteria
retrieving a selection of the e911 call messages from the data store, where the selection is based on a value of the selection criteria associated with a selected one of the models,
for each selected e911 call message,
retrieving trilateration data associated with the mobile communication device that transmitted the selected e911 call message, where the trilateration data retrieved is associated with the time in the selected e911 call message,
calculating an estimated position of the mobile communication device that transmitted the selected e911 call message at the time in the selected e911 call message based on trilateration using the retrieved trilateration data in the one of the models,
determining an error between the self-location in the selected e911 call message and the estimated position of the mobile communication device that transmitted the selected e911 call message, where the self-location in the selected e911 call message is deemed authoritative,
adapting the selected one of the models based on the errors determined based on the e911 call messages selected based on the value of the selection criteria associated with the selected one of the models;
determining a value of the selection criteria that applies to a second mobile communication device;
retrieving trilateration data for the second mobile communication device; and
determining an estimated position of the second mobile communication device based on trilateration using the trilateration data for the second mobile communication device in the adapted trilateration position estimation model associated with the value of the selection criteria that applies to the second mobile communication device.

9. The method of claim 8, wherein the selection criteria identifies a regional delimitation.

10. The method of claim 8, wherein the selection criteria identifies a model of mobile communication device.

11. The method of claim 8, wherein the selection criteria identifies a radio access network (RAN) vendor.

12. The method of claim 8, wherein the selection criteria identifies a cell tower radio transceiver model.

13. The method of claim 8, wherein the mobile communication device is one of a mobile phone, a smart phone, a personal digital assistant (PDA), a media player, a wearable computer, a headset computer, a laptop computer, a notebook computer, or a tablet computer.

14. A method of adapting determination of location of mobile communication devices by cell tower trilateration, comprising:

receiving an emergency (e911) call message from a mobile communication device, wherein the call message comprises a time and a self-location of the mobile communication device determined by the mobile communication device;

storing the time and the self-location information of the e911 call message in a data store;

retrieving the time and self-location information of the e911 call message from the data store;

retrieving trilateration data associated with the mobile communication device that transmitted the e911 call message and associated with the time of the e911 call message;

calculating an estimated position of the mobile communication device at the time of the e911 call message based on the retrieved trilateration data using a trilateration position estimating model;

determining an error between the self-location of the mobile communication device and the estimated position of the mobile communication device determined using the trilateration position estimating model and the retrieved trilateration data, where the self-location of the mobile communication device is deemed authoritative;

adapting the trilateration position estimating model based on the error determined; and determining a position of a second mobile communication device based on using the adapted trilateration position estimating model.

15. The method of claim 14, wherein retrieving trilateration data associated with the mobile communication device comprises retrieving external data representation (XDR) records generated by cell towers from a data store based on an identity of the mobile communication device and a time of the e911 call message.

16. The method of claim 14, wherein the self-location of the mobile communication device comprises global positioning system (GPS) coordinates.

17. The method of claim 14, wherein the mobile communication device is one of a mobile phone, a smart phone, a personal digital assistant (PDA), a media player, a wearable computer, a headset computer, a laptop computer, a notebook computer, or a tablet computer.

18. The method of claim 14, wherein the e911 call is received wirelessly according to at least one of a long term evolution (LTE), a code division multiple access (CDMA), a global system for mobile communications (GSM), or worldwide interoperability for microwave access (WiMAX) wireless communication protocol.

19. The method of claim 14, wherein the processing is restricted to e911 call data and trilateration data associated with a same radio access network (RAN) equipment vendor.

20. The method of claim 14, wherein the processing is restricted to e911 call data and trilateration data associated with a same geographical region.

* * * * *